(12) United States Patent
Selvakumar et al.

(10) Patent No.: US 10,352,076 B2
(45) Date of Patent: Jul. 16, 2019

(54) LOCK DEVICE IN AN ARMREST CONSOLE AND AN ARMREST CONSOLE EMPLOYING THE SAME

(71) Applicant: Ford Global Technologies LLC, Dearborn, MI (US)

(72) Inventors: Puneeth Selvakumar, Chennai (IN); Aurelien Pierre Christian Delaruelle, Glenroy (AU)

(73) Assignee: Ford Global Technologies LLC, Dearborn, MI (US)

( * ) Notice: Subject to any disclaimer, the term of this patent is extended or adjusted under 35 U.S.C. 154(b) by 28 days.

(21) Appl. No.: 15/863,597

(22) Filed: Jan. 5, 2018

(65) Prior Publication Data

US 2018/0209191 A1 Jul. 26, 2018

(30) Foreign Application Priority Data

Jan. 25, 2017 (CN) .................... 2017 2 0097247 U

(51) Int. Cl.
*B60N 2/75* (2018.01)
*E05D 11/10* (2006.01)

(52) U.S. Cl.
CPC .......... *E05D 11/1014* (2013.01); *B60N 2/753* (2018.02); *B60N 2/793* (2018.02); *E05Y 2900/538* (2013.01)

(58) Field of Classification Search
CPC .......... B60N 2/75; B60N 2/753; B60N 2/793; E05D 11/1014; E05Y 2900/538
See application file for complete search history.

(56) References Cited

U.S. PATENT DOCUMENTS

| | | | |
|---|---|---|---|
| 6,375,265 B1 * | 4/2002 | Hubner | B60N 2/767 297/411.32 |
| 7,878,567 B2 | 2/2011 | Schneider et al. | |
| 9,321,381 B2 | 4/2016 | Itzinger | |
| 9,371,023 B2 | 6/2016 | An et al. | |
| 2003/0132234 A1 * | 7/2003 | Hirose | B60R 7/04 220/830 |
| 2010/0066113 A1 * | 3/2010 | Browne | B60N 3/102 296/24.34 |
| 2010/0090485 A1 * | 4/2010 | Cho | B60N 2/793 296/1.09 |
| 2011/0272991 A1 * | 11/2011 | Saxton | B64D 11/06 297/411.46 |

(Continued)

FOREIGN PATENT DOCUMENTS

| | | | | |
|---|---|---|---|---|
| CN | 104260648 | | 1/2015 | |
| CN | 204452229 | | 7/2015 | |
| DE | 102012211447 A1 * | 1/2014 | ............. B60N 2/753 |

*Primary Examiner* — Gregory A Blankenship
(74) *Attorney, Agent, or Firm* — Vichit Chea; Kolitch Romano LLP

(57) ABSTRACT

A lock device for keeping a cover of an armrest console at a full open position comprises a rotation arm having an arm body attached to the cover including a fixed portion and an end. The rotation arm is pivotably connected to a console body of the armrest console, and a detent is disposed at the end of the rotation arm. The detent is configured to be inserted into a slot in a rear wall of the console body when the cover is moved to the full open position and released from the slot when the cover is moved away from the full open position.

19 Claims, 9 Drawing Sheets

(56) References Cited

U.S. PATENT DOCUMENTS

| | | | |
|---|---|---|---|
| 2015/0327683 A1* | 11/2015 | Ross | A47C 7/543 |
| | | | 297/411.32 |
| 2016/0052428 A1* | 2/2016 | Hessdorfer | B60N 2/43 |
| | | | 297/411.32 |
| 2016/0052429 A1* | 2/2016 | Hessdorfer | B60N 2/78 |
| | | | 297/411.32 |
| 2017/0334323 A1* | 11/2017 | Stuiber | G05G 1/62 |
| 2017/0334324 A1* | 11/2017 | Keller | B60N 2/427 |
| 2018/0099590 A1* | 4/2018 | Choi | B60N 2/919 |
| 2018/0209191 A1* | 7/2018 | Selvakumar | E05D 11/1014 |
| 2018/0304788 A1* | 10/2018 | Park | B60N 2/75 |

* cited by examiner

LOCK DEVICE IN AN ARMREST CONSOLE AND AN ARMREST CONSOLE EMPLOYING THE SAME

RELATED APPLICATION

This application claims the benefit of Chinese Patent Application No.: CN 201720097247.9 filed on Jan. 25, 2017, the entire contents thereof being incorporated herein by reference.

FIELD

The present disclosure relates generally to armrest consoles. In particular, armrest consoles with a lock device to keep a cover of the armrest consoles at a full open position are described.

BACKGROUND

Console armrests when opened should stay in an open position until a user closes it and should not shut as a result of vehicle acceleration or any other unintentional contact. Known armrest consoles with lock devices, or devices to keep an armrest console at a full open position are not entirely satisfactory for the range of applications in which they are employed. For example, existing armrest consoles with a device to keep a console at a full open position can be expensive to manufacture and may break or otherwise become inoperable because of the complexity of the device. Some current armrest consoles use a spring loaded hinge in the armrest console to hold it in an open position. However, the spring loaded hinge includes multiple parts and can break easily if the hinge is not positioned correctly. Other armrest consoles will instead use a damper and hinge to keep a cover of an armrest at a full open position.

Thus, there exists a need for armrest consoles with a lock device to keep a cover of the armrest console at a full open position that improve upon and advance the design of known armrest consoles. Examples of new and useful armrest consoles with a lock device relevant to the needs existing in the field are discussed below.

SUMMARY

The present disclosure is directed to a lock device for keeping a cover of an armrest console at a full open position. According to one aspect, the lock device has a rotation arm body attached to the cover, which includes a fixed portion and an end. The rotation arm is pivotably connected to a console body of the armrest console. A detent is on the end of the lock arm and is configured to be inserted into a slot in a rear wall of the console body when the cover is moved to the full open position, and released from the slot when the cover is moved away from the full open position.

By configuring the detent to be inserted into the slot in the rear wall, the slot will hold the rotation arm in a fixed position using frictional forces. With the rotation arm fixed, the cover will also be fixed, as it is attached to the rotation arm. Thus, the cover can be fixed in an open position using the detent on the rotation arm. When the detent is removed from the slot, the rotation arm is free to rotate. Likewise, the cover is free to rotate away from the full open position and into a closed position covering the console body.

Furthermore, the detent protrudes from a main surface of the rotation arm, and a guide surface facilitates insertion of the detent into the slot. The guide surface also facilitates the release of the detent from the slot. The guide surface has a sloped surface or a curved surface that guides the detent into the slot to lock the detent, and in turn, the arm in a full open position.

Still further, the detent protrudes from a main surface of the rotation arm and includes a first surface extending from the main surface and a second surface substantially perpendicular to the first surface and a tip stepped away from the first surface. The tip is inserted into the slot on the rear wall of the console body when the cover is at the full open position. The tip of the detent inserted into the slot will hold the cover in a full open position.

The detent is made from material that is capable of elastically being deflected to allow the detent to be moved into the slot when the cover is rotated to the full position and released from the slot when the cover is rotated down toward a closed position. The lock arm is made from polypropylene (pp) and 20% of talc, and the rotation arm and the detent are integrally formed. Additionally, the detent is integrally formed with the rotation arm and disposed along a width direction of the rotation arm.

In order to strengthen the rotation arm and detent, the rotation arm includes a first reinforcement rib along the width direction and adjacent to the detent, and a plurality of second reinforcement ribs substantially perpendicular to the first reinforcement rib to strengthen the detent. Additionally, for strength in the detent, the detent can include an overmolded rubber insert.

According to another aspect, an armrest console is provided. The armrest console comprises a console body including a main compartment for storage and a back body. The main compartment has a rear wall adjacent to the back body, and the rear wall includes at least one slot facing the back body. A rotation arm with an arm body includes a fixed portion and an end. The end has a first end and a second end. The fixed portion of the rotation arm is pivotably connected to the back body, and the end includes a detent. A cover attached to the rotation arm and rotatably connected to the back body opens and closes an upper surface of the main compartment. The detent is configured to be inserted into the slot in a rear wall of the main compartment when the cover is moved to the full open position and released from the slot when the cover is moved away from the full open position.

Furthermore, there is a guide surface for the detent to facilitate insertion of the detent into the slot and release of the detent from the slot. The rotation arm and the detent are integrally formed and made from material capable of being elastically deformed to allow the detent to move into the slot when the cover is rotated to the full position and released from the slot when the cover is rotated down toward a closed position. The detent protrudes from a main surface of the rotation arm and includes a first surface extending from the main surface and a second surface substantially perpendicular to the first surface and a tip stepping away from the first surface and extending from the second surface. The tip is inserted into the slot on the rear wall of the back body to keep the cover in the full open position.

The rear wall includes a plurality of ribs projecting from the rear wall toward the rotation arm. At least one slot is formed in the ribs. Alternatively, the rear wall includes three slots on a left rib, a center rib and a right rib, respectively. The rib has a stop surface to contact the first surface of the detent to prevent the rotation arm from opening further and stop the cover at its full open position. To ensure the detent is directed toward the rib during rotation, there is a guide surface in a rotation path of the rotation arm. The guide path is formed of an angle with the stop surface, and the slot is formed on the guide surface.

According to another aspect, the detent is integrally formed with the rotation arm, and the detent is disposed along a width direction of the rotation arm. The rotation arm includes a first reinforcement rib along the width direction and adjacent to the detent to strengthen the rotation arm and detent. Additionally, a plurality of second reinforcement ribs are substantially perpendicular to the first reinforcement rib to strengthen the detent.

According to yet another aspect, the armrest console is comprised of a console body including a main compartment for storage and a back body. The main compartment has a rear wall adjacent to the back body. The real wall includes a guide surface in a rotation path of the rotation arm, and a stop surface formed of an angle with the guide surface. The rotation arm has an arm body including a fixed portion and an end and is pivotably connected to the back body. The end includes a detent made of elastic material.

There is a cover attached to the rotation arm that is rotatably connected to the back body to open and close an upper surface of the main compartment. There is also a detent configured to contact the stop surface and the guide surface of the rear wall and will deform to lock the rotation arm by friction when the cover is moved to the full open position and released from the slot when the cover is moved away from the full open position. The detent includes an over-molded rubber insert.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
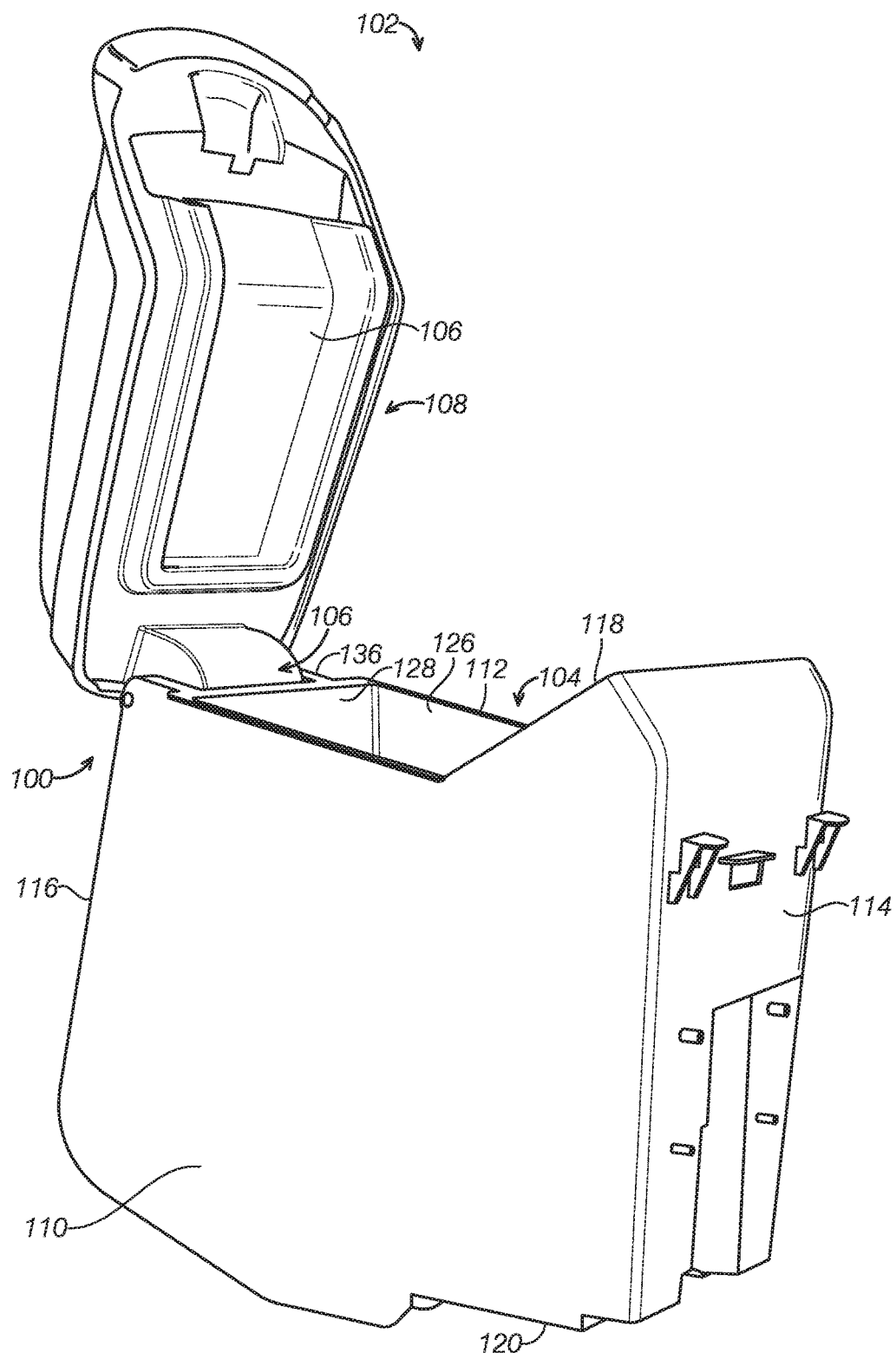
FIG. 1 is a perspective view of an armrest console with a lock device to keep a cover of the armrest console at a full open position according to one example embodiment of the present disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed lock devices for keeping a cover of an armrest console at a full open position will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various lock devices for keeping a cover of an armrest console at a full open position are provided. Related features in the examples may be identical, similar, or dissimilar in different examples, the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-5, an example embodiment of an armrest lock device 100 will now be described. Lock device 100, located on armrest console 102, functions to keep a cover of an armrest console at a full open position. The reader will appreciate from the figures and description below that lock device 100 addresses shortcomings of conventional devices that hold covers of armrest consoles at a full open position. In some embodiments, a lock device of an armrest console of the present disclosure may comprise a rotation arm 106 having an arm body, a fixed portion and a first end and second end, where a cover is attached at the first end and a detent is disposed at the second end of the lock arm. The rotation arm is pivotably connected to a console body of the armrest console. The detent is configured to be inserted into a slot in a rear wall of the console body when the cover is moved to the full open position and released from the slot when the cover is moved away from the full open position. Lock device 100 may be integrated within the armrest console 102 and rotation arm 106 substrate without any additional or exclusive parts to keep the armrest console at a full open position. As no additional parts such as a spring and a damper is used to keep the cover locked in the fully open position, the lock device of the present disclosure uses less parts than prior devices made for armrest consoles to keep a cover in a full open position. Using less parts has many benefits. One benefit is that lock device 100 will be cheaper. With less parts, costs for parts and manufacturing cost for labor will be reduced.

FIG. 1 shows a perspective view of an armrest console 102 with a lock device 100 to keep a cover 108 of the armrest console at a full open position. Armrest console 102 may be used in a vehicle. It should be appreciated that the present invention may be used in any apparatus that needs to keep a cover at an open position. Armrest console 102 may include a console body 104 including a main compartment 126 and a back body 136. In some embodiments, main compartment 126 may be a rectangular, box-shaped compartment with an open end at the top 118, and is configured to accept, hold, and store items within. In some embodiments, main compartment 126 may be configured to fit inside a vehicle, next to a seat, and allow for drivers and passengers of the vehicle store items within it. Main compartment 126 may include a rear wall 128 located toward the rear 116 of armrest console 102. Rear wall 128 may face back body 136 or may be a wall shared by main compartment 126 and back body 136. Back body 136 may be located on the back of console body 104 as described in detail below. In some embodiments, back body 136 may include a wall to enclose the parts such as rotation arm 106 and rear wall 128 for better appearance of console body 104.

Figure 2:
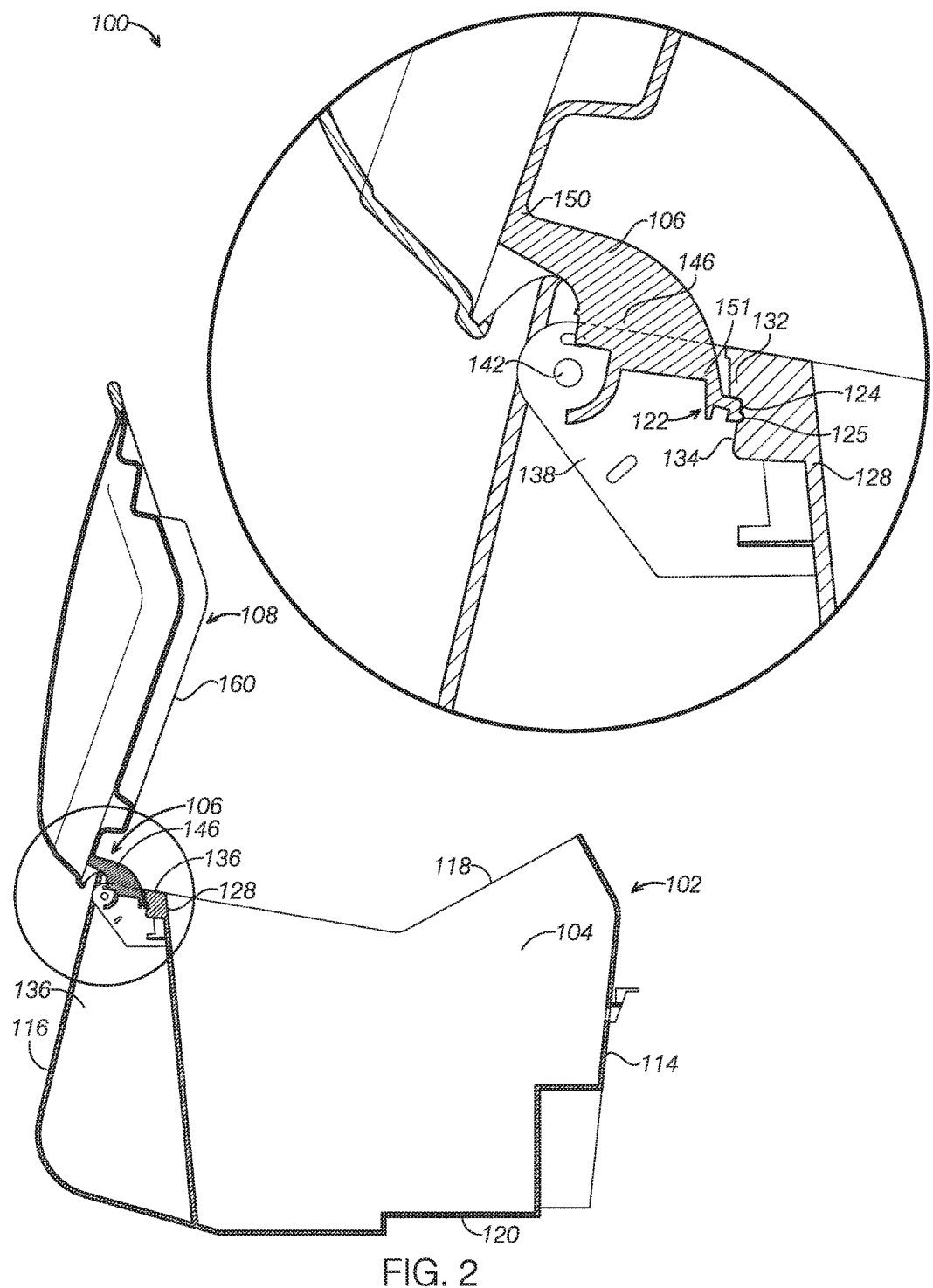
FIG. 2 is a cross sectional side view of the armrest console with a lock device shown in FIG. 1 depicting the lock device in a lock position and the cover at a full open position.
Figure 3:
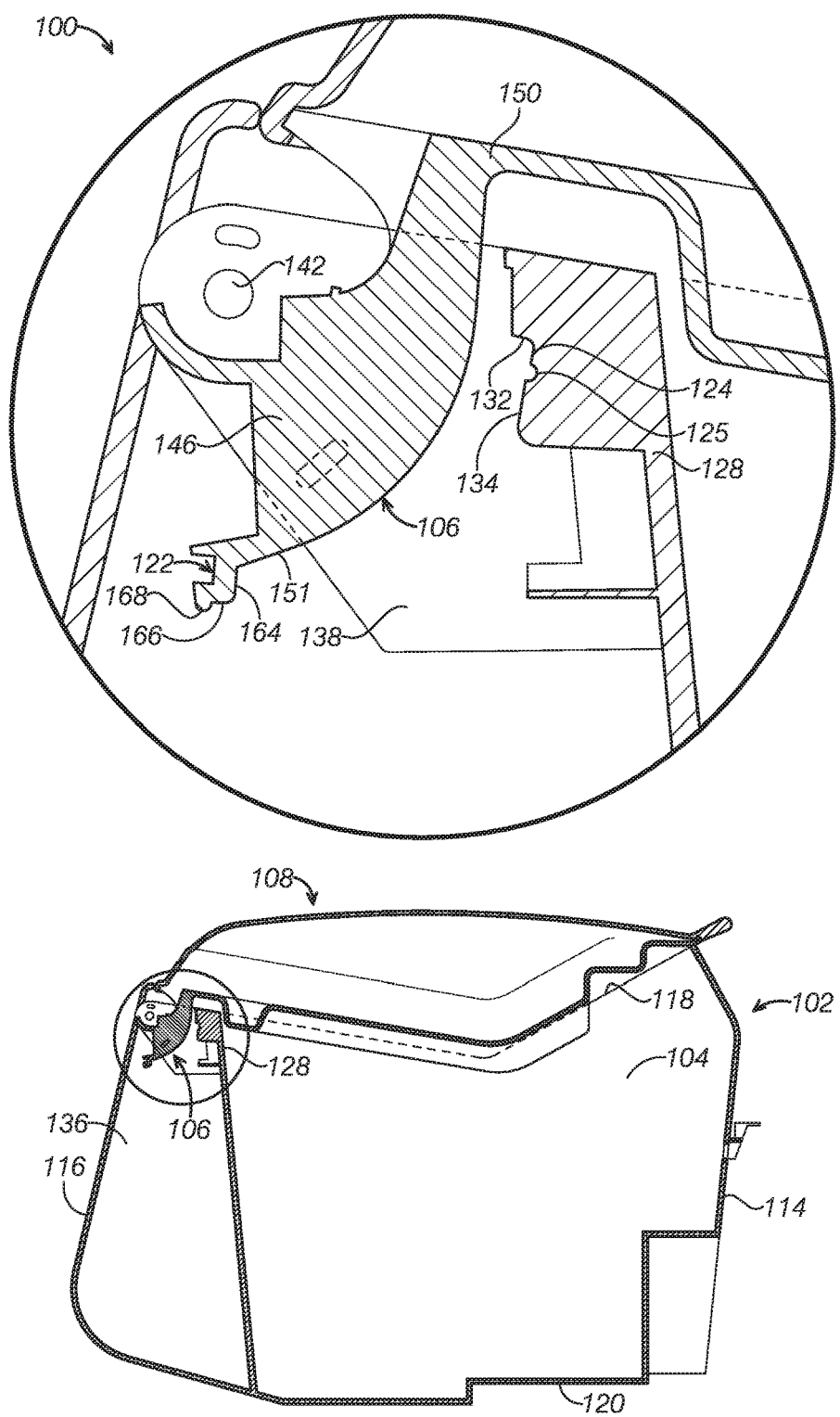
FIG. 3 is a cross sectional side view of the armrest console with a lock device shown in FIG. 1 depicting the lock device not in a lock position and the cover in a closed position.

Now referring to FIGS. 2 and 3, a lock device 100 on armrest console 102 may include a rotation arm 106 having an arm body 146, a first end 150 and second end 151, where first end 150 is attached to cover 108 and the second end 151 includes a detent 122. FIG. 2 is a cross sectional side view of the armrest console with lock device shown in FIG. 1 depicting lock device 100 in a lock position and cover 108 at a full open position. Rear wall 128 of main compartment 118 may include a slot 124 configured to receive detent 122 when cover 108 is at the full open position. As can be seen in FIG. 2, the rotation arm 106 may include detent where the detent 122 is positioned in a slot 124 located on the console body 104. Arm body 146 may be configured to enable detent 122 to insert into slot 124 when cover 108 is rotated to the full open position.

FIG. 3 is a cross sectional side view of the armrest console with lock device 100, depicting lock device 100 not in a lock position and the cover in a closed position. As can be seen in FIG. 3, when rotation arm 106 is in a closed position (i.e., upper surface 160 of cover 108 covers the main compartment 126 of armrest console body 104), detent 122 may be below arm body 146 and not interacting with the armrest console body 104. It should be appreciated that detent 122 may be released away from slot 124 when cover 108 is at any position between the closed position and the full open position. Now referring to FIGS. 2 and 3, when cover 108 is lifted, rotation arm 106 is rotated, and detent 122 begins to rotate toward the front 114. As rotation arm 106 rotates, detent 122 will begin to contact a guide surface 134 of rear wall 128. Guide surface 134 has a radius at a lower portion. When detent 122 contacts the radius portion of guide surface 134, friction is initiated. In some embodiments, detent 122 may elastically flex as rotation continues, and guide surface 134 may guide detent 122 toward and into slot 124. A lock at a full open position of cover 108 is achieved when detent 122 is inserted into slot 124. To stop rotation and withstand unwanted pulling up of cover 108, a first surface 164 of detent 122 may contact a stop surface 132 to resist further rotation beyond the full open position. The friction between the detent 122 and the slot 124 may prevent rotation arm 106 to move away from the slot 124, thus locking the cover 108 at an open position. In some embodiments, slot 124 may be formed by stop surface 132, a retaining surface opposite to stop surface 132 and a surface in-between. The retaining surface may help keep the detent in the slot.

Figure 5:
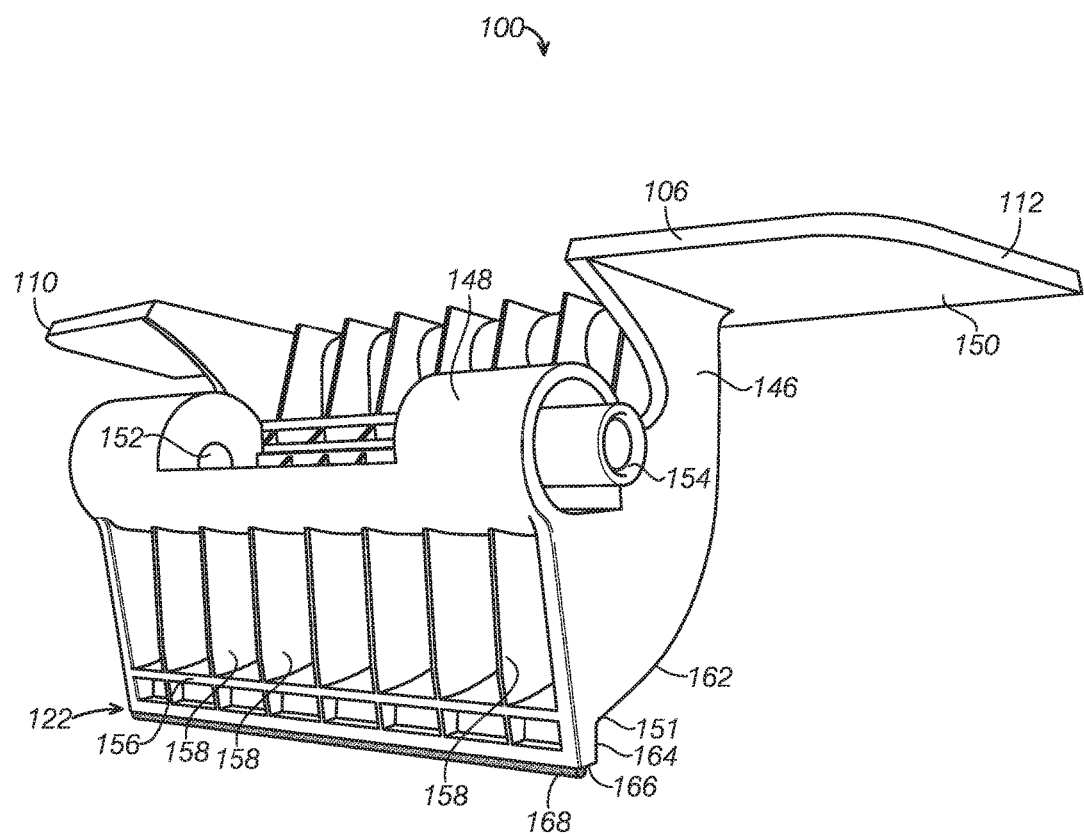
FIG. 5 is a perspective side angle view of the rotation arm of the armrest console with a lock device shown in FIG. 1, depicting the rotation arm of the armrest console without a console body.

With further reference to FIG. 5, in some embodiments, detent 122 may include a tip 168 that interacts with an indentation 125 on guide surface 134 to stop rotation and lock the cover 108 in an open position. When cover 108 is pushed down, rotation arm 106 is rotated and detent 122 is elastically flexed toward the bottom 120 such that it will disengage from slot 124.

Slot 124 may have varied configuration depending on the structure of the armrest console. In some embodiments, slot 124 may be formed on rear wall ribs of rear wall 128. Now referring to FIG. 4, rear wall 128 of console body 104 may include one or more rear wall ribs 130 extending from rear wall 128 outside of main compartment 126. Rear wall ribs 130 may be structures that support and add to the structural integrity of main compartment 126 of console body 104. Additionally, rear wall ribs 130 may act as a stop and lock for rotation arm 106. Rear wall ribs 130 are vertically situated, extending downward from top 118. Located toward the rear 116 of console body 104 is a slot 124.

Figure 4:
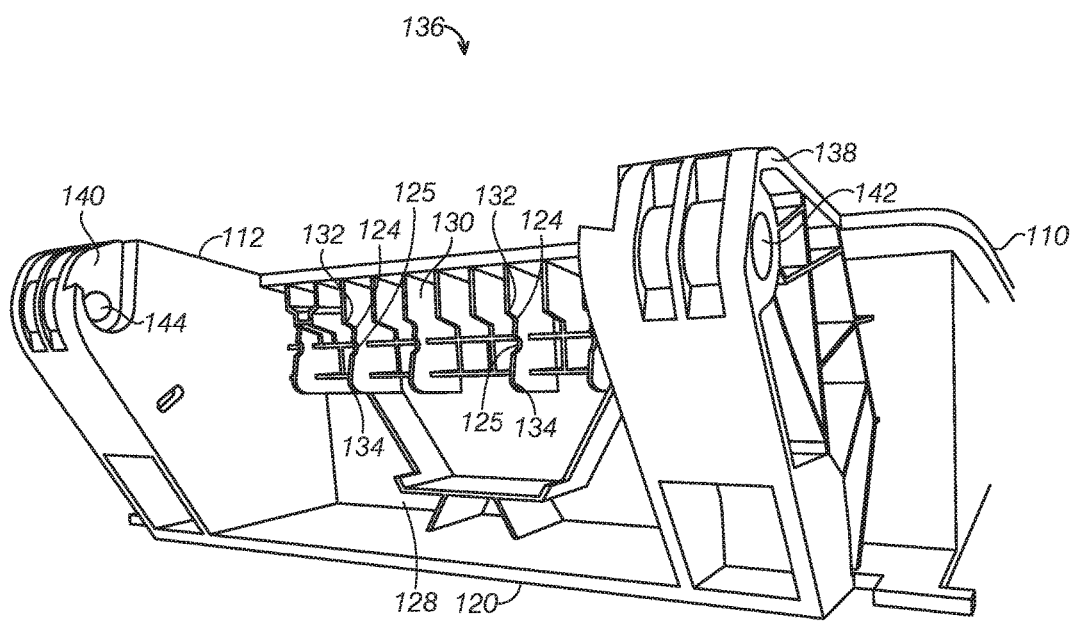
FIG. 4 is a perspective side angle view of a rear wall of the armrest console with a lock device shown in FIG. 1, depicting the rear wall of the armrest console without a rotation arm.

As further seen in FIG. 4, slot 124 may include an indentation 125. Indentation 125 may be a notch, or other similar void in at least one of rear wall ribs 130. Slot 124 and indentation 125 assist to lock rotation arm 106 to be locked in an open position. Rear wall ribs 130 may include three ribs, where there is a center rib, a left rib, and a right rib. In other examples, Rear wall ribs may include more than or less than three ribs, where the ribs can be symmetrical on the left and right side, or asymmetrical. Situated above indentation 125 on rear wall ribs 130 is a stop surface 132. Stop surface 132 may be situated on a path of the rotation of rotation arm 106, and may stop rotation of rotation arm 106 and assist to lock rotation arm 106 in an open position. Situated as part of slot 124 and extending toward bottom 120 on rear wall ribs 130 is a guide surface 134. Guide surface 134 may face rearward on rear wall ribs 130. Indentation 125 may be included in guide surface 134. Guide surface 134 is a smooth surface that is sloped or curved to assist in guiding the rotation of rotation arm 106 and further assists to hold rotation arm 106 in an open position. In the depicted embodiment, slot 124 is defined by stop surface 132 and guide surface 134, and stop surface 132 and guide surface 134 form an angle. It should be appreciated that a slot may be formed by three surfaces, a stop surface, a retaining surface opposite to the stop surface and a surface situated between the stop surface and the retaining surface.

As described above, console body 104 further includes a back body 136. Back body 136 may be a support structure and connection member extending outward from main compartment 126 and adjacent to rear wall 128, further toward the rear 116. Back body 136 may include a right arm 138 and left arm 140. Both right arm 138 and left arm 140 may extend outward and away from rear wall 128. A right pivot hole 142 may be located in right arm 138, and is a circular hole extending completely through right arm 138 in or horizontal fashion, or from right side 110 to left side 112. Likewise, a left pivot hole 144 may be located in left arm 140 and is a circular hole extending completely through left arm 140 in a horizontal fashion, or from right side 110 to left side 112. In alternate embodiments, right pivot hole 142 and left pivot hole 144 do not extend completely through right arm 138 and left arm 140. Right pivot hole 142 and left pivot hole 144 may be substantially aligned such that they share a common rotational axis. It should be appreciated that any appropriate mechanisms may be used to rotate and open and close the cover of the armrest console.

Now referring to FIG. 5 and with further reference to FIG. 4, rotation arm 106 may include an arm body 146 where arm body 146 includes a fixed portion 148, a first end 150 and a second end 151. Fixed portion 148 may be pivotably connected to back body 136 by right pivot insert 152 and left pivot insert 154. Right pivot insert 152 may be cylindrical in shape and protrudes horizontally from right side 110 of arm body 146. Similarly, left pivot insert 154 may be cylindrical in shape and protrudes horizontally from left side 112 of arm body 146. Right pivot insert 152 and left pivot insert 154 may be substantially aligned such that they share a common rotational axis. Arm body 146 may be pivotably connected to back body 136 by inserting right pivot insert 152 into right pivot hole 142, and left pivot insert 154 into left pivot hole 144, such that the rotational axis of right pivot hole 142 and left pivot hole 144 aligns with the rotational axis of right pivot insert 152 and left pivot insert 154. Connecting arm body 146 to back body 136 in this manner allows rotation arm 106 to rotate around the rotational axis. Arm body 146 can be made from any sturdy material, for example, polypropylene (pp) and 20% of talc.

Continuing with FIG. 5, rotation arm 106 may include one or more arm strengthening ribs. These strengthening ribs may include one or more first reinforcement ribs 156 and one or more second reinforcement ribs 158. One or more first reinforcement ribs 156 extend from right side 110 to left side 112 of rotation arm 106, or along a width of rotation arm 106. One or more second reinforcement ribs 158 extend from fixed portion 148 to second end 151 of rotation arm 106. First reinforcement ribs 156 and second reinforcement ribs 158 strengthen rotation arm 106 and detent 122.

Now referring to FIG. 2, fixed portion 148 of rotation arm 106 may be attached to cover 108, and thus cover 108 may also be rotatably connected to back body 136. Cover 108 may rotatably open and close the top 118 of the main compartment 126 of console body 104 with its upper surface 160. When cover 108 is in a fully open position, it is capable of being locked in place in the fully open position by detent 122. Cover 108 may then be unlocked from the fully open position and closed to cover the main compartment 126 of console body 104.

Continuing on FIG. 5 and with reference to FIG. 2 and FIG. 3, second end 151 of arm body 146 may also include a main surface 162, and detent 122. Detent 122 may include a first surface 164 and a second surface 166. First surface 164 of detent 122 faces toward the front 114 when rotation arm 106 is in a closed position, and faces toward the top 118 and contact stop surface 132 when rotation arm 106 is in at a position where cover 108 is fully open. Second surface 166 of detent 122 is substantially perpendicular to first surface 164. In some embodiments, detent 122 may include a tip 168. Tip 168 protrudes from second surface 166 away from fixed portion 148 of arm body 146, and is configured to be secured in indentation 125 of rear wall rib 130. Rotation arm 106 and detent 122 can be integrally formed.

Figure 6:
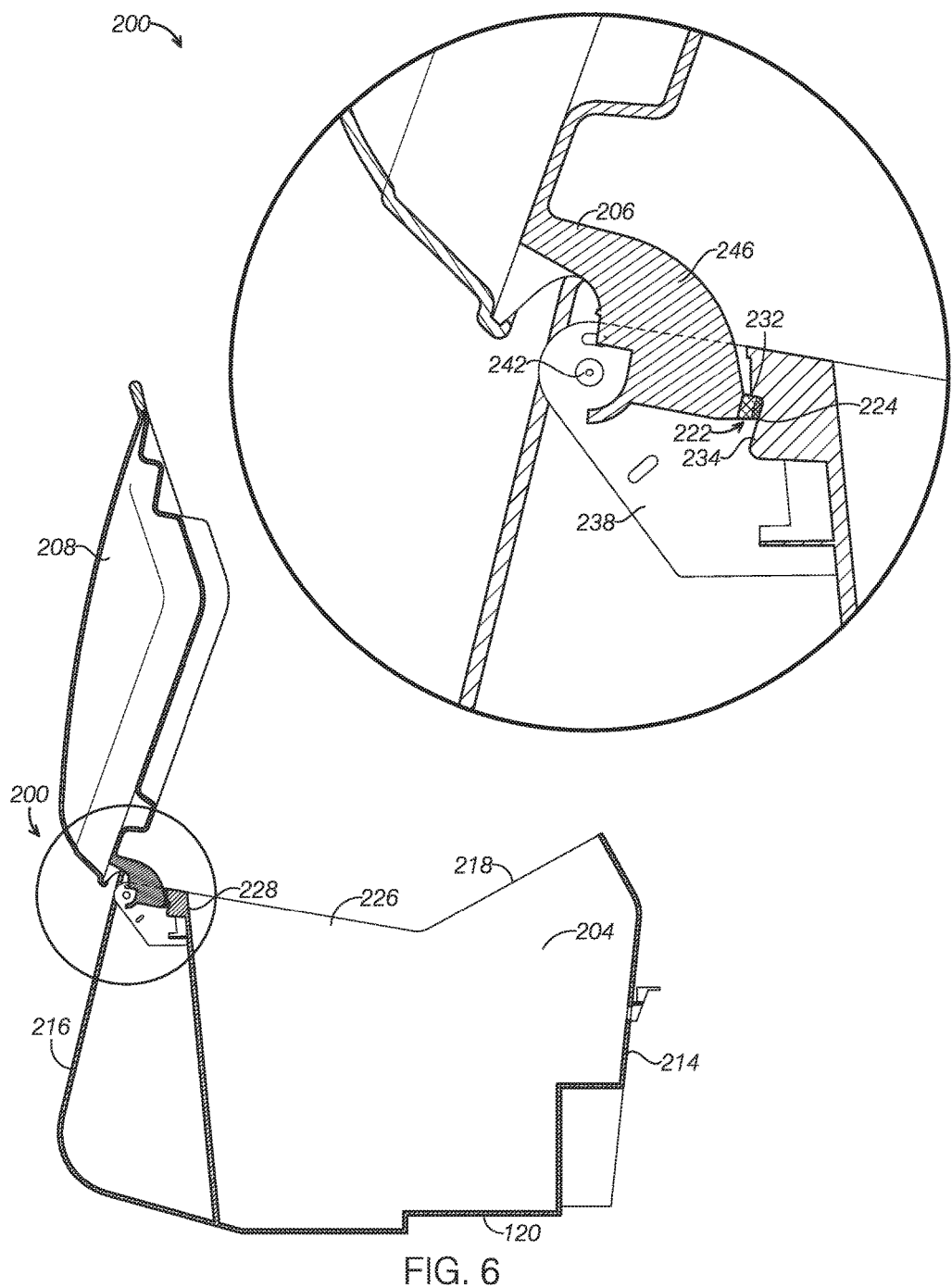
FIG. 6 is a cross sectional side view of another example embodiment of an armrest console with a lock device, depicting the lock device in a lock position and the cover at a full open position, where a detent contacts a stop surface.
Figure 7:
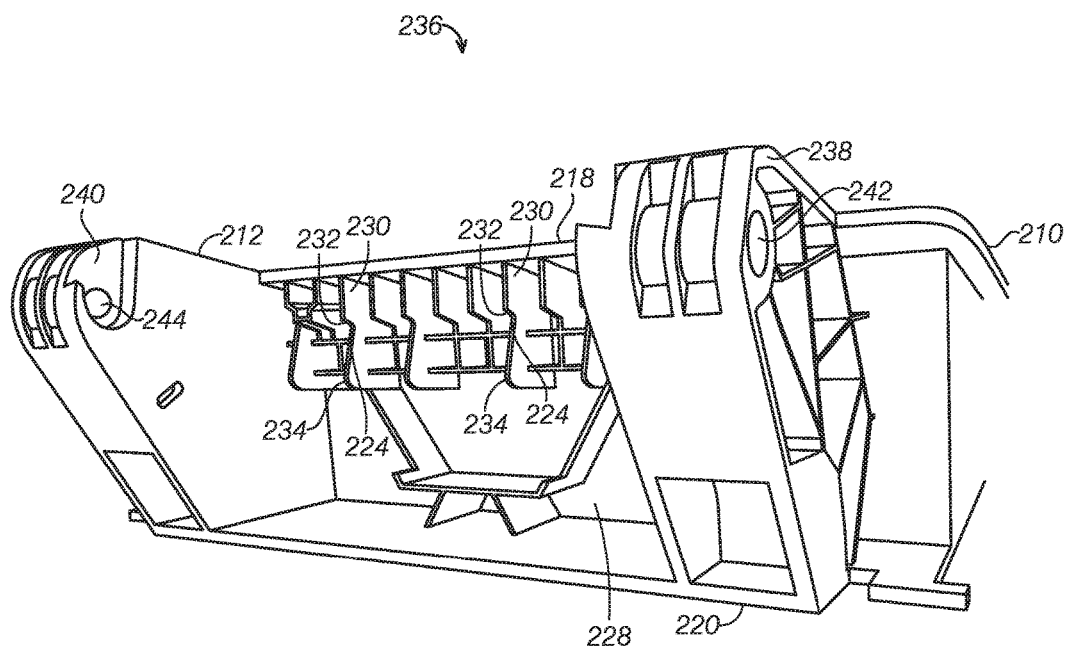
FIG. 7 is a perspective side angle view of a rear wall of the example embodiment of an armrest console with a lack device shown in FIG. 6, depicting the rear wall of the armrest console without a rotation arm.
Figure 8:
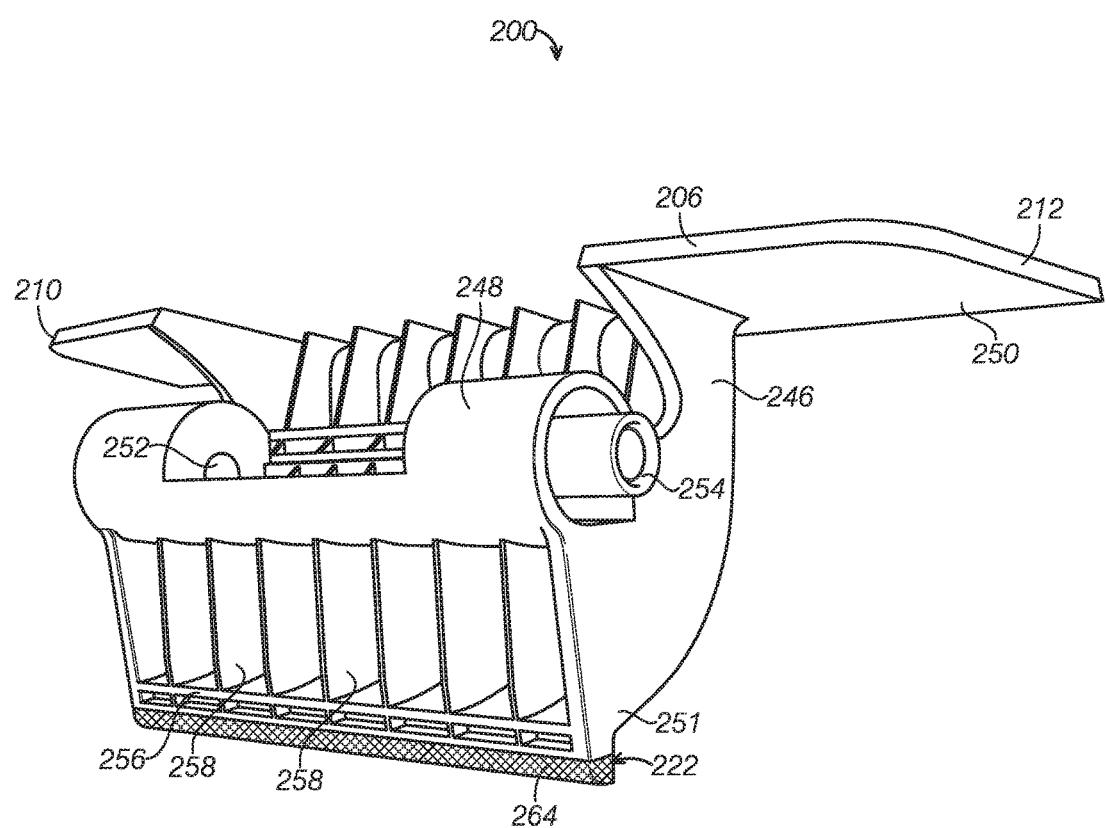
FIG. 8 is a perspective side angle view of the rotation arm of the example embodiment of an armrest console with a lock device shown in FIG. 6, depicting the rotation arm of the armrest console without a console body.

Turning attention to FIGS. 6-8, another example embodiment of an armrest lock device, lock device 200, will now be described. Lock device 200 includes many similar or identical features to Lock device 100. Thus, for the sake of brevity, each feature of lock device 200 will not be redundantly explained. Rather, key distinctions between lock device 200 and lock device 100 will be described in detail and the reader should reference the discussion above for features substantially similar between the two lock devices.

As can be seen in FIG. 6, lock device 200 may include an armrest console body 204, a rotation arm 206, and a cover 208, and there is a right side 210 and left side 212, front 214, rear 216, top 218 and bottom 220. As can be seen in FIG. 6, connected to the rotation arm 206 may be a detent 222, where the detent 222 interacts with a slot 224 located on the console body 204 to lock the rotation arm 206 in a full open position. Detent 222 may include an over-molded rubber insert.

In this example, detent 222 may be compressed or partially deformed to be retained on rear wall 228 of main compartment, and thus locking the cover 208 in a full open position.

As can be seen in FIG. 7, rear wall 228 of console body 204 may include one or more rear wall ribs 230 extending from rear wall 228 outside of the storage area of main compartment 226. Located toward the rear 216 of rear wall ribs 230 may be a slot 224. Slot 224 may be defined by two surfaces, a stop surface 232 and a guide surface 234. Situated as part of slot 224 and extending toward bottom 220 on rear wall ribs 230 is a guide surface 234. Stop surface 232 may be situated on a rotation path of the rotation arm 206 and may stop further movement of rotation arm 206 at the full open position. Rotation arm 206 may be configured such that detent 22 is compressed against guide surface 234 at the full open position. In this way, rotation arm 206 does not move down at the full open position due to high friction between the detent (e.g., detent made from rubber material) and guide surface 234.

As can be seen in FIG. 7, console body 204 may further include a back body 236. Back body 236 includes a right arm 238 and left arm 240. A right pivot hole 242 may be located in right arm 238, and a left pivot hole 244 may be located in left arm 240.

As can be seen in FIG. 8, rotation arm 206 may include an arm body 246 where arm body 246 may include a fixed portion 248, a first end 250 and second end 251. Fixed portion 248 is pivotably connected to back body 236 by right pivot insert 252 and left pivot insert 254. Right pivot insert 252 may be cylindrical in shape and protrudes horizontally from right side 210 of arm body 246. Similarly, left pivot insert 254 may be cylindrical in shape and protrudes horizontally from left side 212 of arm body 246. Right pivot insert 252 and left pivot insert 254 may be substantially aligned such that they share a common rotational axis. Arm body 246 may be pivotably connected to back body 236 by inserting right pivot insert 252 into right pivot hole 242, and left pivot insert 254 into left pivot hole 244, such that the rotational axis of right pivot hole 242 and left pivot hole 244 aligns with the rotational axis of right pivot insert 252 and left pivot insert 254. Connecting arm body 246 to back body 236 in this manner allows rotation arm 206 to rotate around the rotational axis. Arm body 246 can be made from any sturdy material, including polypropylene (pp) and 20% of talc.

As can be seen in FIG. 8, rotation arm 206 may include one or more arm strengthening ribs. These strengthening ribs may include one or more first reinforcement ribs 256 and one or more second reinforcement ribs 258. One or more first reinforcement ribs 256 extend from right side 210 to left, side 212 of rotation arm 206, or along what could be considered the width of rotation arm 206. One or more second reinforcement ribs 258 extend from fixed portion 248 to second end 151 of rotation arm 206. First reinforcement ribs 256 and second reinforcement ribs 258 strengthen rotation arm 206 and detent 222.

When cover 208 is in a fully open position, it is capable of being locked in place in the fully open position by detent 222 through friction and compressive forces. Cover 208 may then be unlocked from the fully open position and closed to cover the main compartment 226 of console body 204. By using friction and compressive forces to hold cover 208 in an open position, manufacturing tolerances for lock device 200 may be greater. The mechanical fit and interactions of rotation arm 206 and back body 236 do not need to interact in an exact manner. Rather, the size of detent 222 as it compresses accounts for the greater manufacturing tolerances that would otherwise be needed.

As can be seen in FIG. 8, second end 251 of arm body 246 may also include a detent 222 which protrudes from second end 251. Detent 222 may include material that is more elastic or more deformable and has greater friction. In one example, detent 222 may include an over-molded rubber insert. In some embodiments, the rotation arm 206 may be configured to fit detent 222 into slot 224 with the detent 222 deformed or shortened along an insertion direction into slot 224. In this way, detent 222 is pressed against stop surface 232 and guide surface 234 to stay in slot 224. Further, friction between the rubber and the slot surface keep detent 224 in the locked position. Thus, the slot with two surfaces is sufficient to lock the detent in the locked position.

Referring to FIG. 6, as cover 208 is lifted, rotation arm 206 is rotated, and detent 222 may begin to rotate toward the front 214. As rotation arm 206 rotates, detent 222 may begin to contact guide surface 234 of rear wall ribs 230. The friction is initiated when detent 222 contacts the radius portion rear wall rib 230. Detent 222 may be compressed as rotation continues, and guide surface 234 may guide detent 222 toward and into slot 224. The further rotation arm 206 is rotated, the more detent 222 may be compressed, thus increasing the friction and forces holding the cover 208 in a full open position. In one example, an interference of two millimeters may be configured between detent 222 and slot 224 at the full open position of the cover. That is, guide surface 234 may include an interference surface at upper portion adjacent to stop surface 232, and the inference exists between detent 222 and the inference surface. Because of its elastic property, detent 222 having the rubber insert may be deformed to contact the interference surface and thus fit into slot 224. A lock at the full open position of the cover is achieved when detent 222 is inserted into slot 224 and compressed or temporarily deformed. To stop unwanted movement, first surface 264 of detent 222 may contact stop surface 232 to resist further rotation beyond the full open position.

It should be appreciated that the rear wall may have any suitable configuration to form a slot to receive the detent of the lock device. For example, a block may be formed on the rear wall and the slot may be formed on the block.

Figure 9:
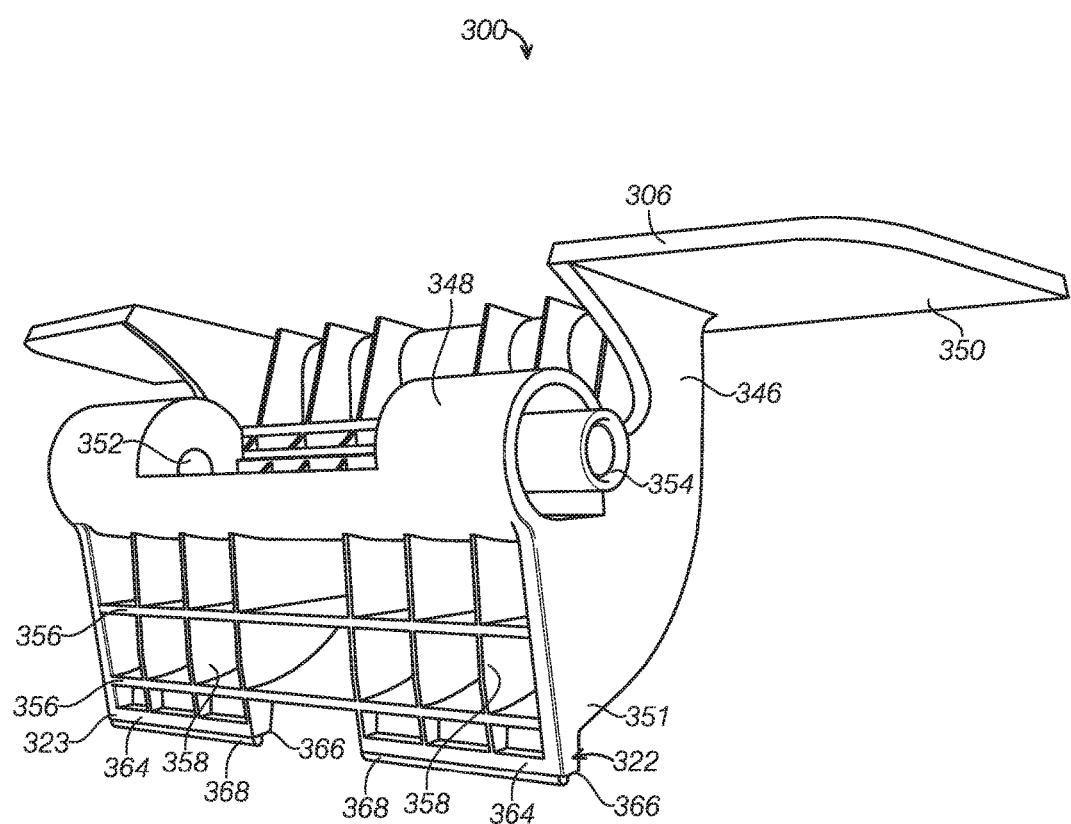
FIG. 9 is a perspective side angle view of the rotation arm of another example embodiment of an armrest console with a lock device, depicting the rotation arm of the third example having more than one detent.

Turning attention to FIG. 9, another example of an armrest lock device, lock device 300, will now be described. Lock device 300 may include many similar or identical features to Lock device 100 and lock device 200. Thus, for the sake of brevity, each feature of lock device 200 will not be redundantly explained. Rather, key distinctions between lock device 300 and lock device 100 and lock device 200 will be described in detail and the reader should reference the discussion above for features substantially similar between the lock devices.

As can be seen in FIG. 9, lock device 300 may include a rotation arm 306. Connected to the rotation arm 306 may be a left detent 322 and a right detent 323. Left detent 322 and right detent 323 may interact with a slot located on a console body, as previously described in other examples. In this example, there may be more than one detent.

As can be seen in FIG. 9, rotation arm 306 may include an arm body 346 where arm body 346 includes a fixed portion 348, a first end 350 and second end 351. Fixed portion 348 may be pivotably connected to a back body by right pivot insert 352 and left pivot insert 354. Rotation arm 306 may include one or more arm strengthening ribs. These strengthening ribs may include one or more first reinforcement ribs 356 and one or more second reinforcement ribs 358. One or more first reinforcement ribs 356 may extend from right side 310 to left side 312 of rotation arm 306, or along what could be considered the width of rotation arm 306. One or more second reinforcement ribs 358 may extend from fixed portion 348 to second end 151 of rotation arm 306. First reinforcement ribs 356 and second reinforcement ribs 358 strengthen rotation arm 306 and detent 322 and 323.

As can be seen in FIG. 9, second end 351 of arm body 346 may also include two detents, a right detent 323 and left detent 322, which protrude from second end 351. Right detent 323 and left detent 322 may include a first surface 364, a second surface 366, and a tip 368. Second surface 366 of detents 322 and 323 is substantially perpendicular to first surface 364. Tip 368 of right detent 323 and left detent 322 may protrude from second surface 366 away from fixed portion 348 of arm body 346.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A lock device for keeping a cover of an armrest console at a fully open position, comprising:
    a rotation arm having an arm body attached to the cover including an arm body and an end, wherein the rotation arm is pivotably connected to a console body of the armrest console; and
    a detent disposed at the end of the rotation arm,
    wherein the detent is configured to be inserted into a slot formed on a rib projecting from a rear wall of the console body when the cover is moved to the fully open position and released from the slot when the cover is moved away from the fully open position.

2. The lock device of claim 1, wherein the detent protrudes from a main surface of the rotation arm and the slot is at least defined by a stop surface to stop further movement of the rotation arm at the fully open position and a guide surface to facilitate insertion of the detent into the slot and release of the detent from the slot.

3. The lock device of claim 2, wherein the guide surface has a sloped surface or a curved surface.

4. The lock device of claim 1, wherein the detent protrudes from a main surface of the rotation arm and includes a first surface extending from the main surface and a second surface substantially perpendicular to the first surface and a tip protruding from the second surface, and wherein the tip is inserted into an indentation on the slot in the rear wall of the console body when the cover is at the full open position.

5. The lock device of claim 1, wherein the detent is made from material that is capable of elastically being deflected to allow the detent to be moved into the slot when the cover is rotated to the fully open position and released from the slot when the cover is rotated down toward a closed position.

6. The lock device of claim 4, wherein the arm body is made from polypropylene (pp) and 20% of talc, and the rotation arm and the detent are integrally formed.

7. The lock device of claim 1, wherein the detent is integrally formed with the rotation arm, wherein the detent is disposed along a width direction of the rotation arm.

8. The lock device of claim 7, wherein the rotation arm includes a first reinforcement rib along the width direction and adjacent to the detent, and a plurality of second reinforcement ribs substantially perpendicular to the first reinforcement rib to strengthen the detent.

9. The lock device of claim 1, wherein the detent includes an over-molded rubber insert.

10. An armrest console, comprising:
a console body including a main compartment for storage and a back body, wherein the main compartment has a rear wall adjacent to the back body, and the rear wall includes at least one slot facing the back body;
a rotation arm having an arm body including a fixed portion and an end, wherein the rotation arm is pivotably connected to the back body, and the end includes a detent;
a cover attached to the rotation arm and rotatably connected to the back body to open and close an upper surface of the main compartment;
wherein the detent is configured to be inserted into the at least one slot in a rear wall of the main compartment when the cover is moved to the fully open position and released from the slot when the cover is moved away from the fully open position,
wherein the rear wall includes a plurality of ribs projecting from the rear wall toward the rotation arm, and the at least one slot is formed in the ribs.

11. The armrest console of claim 10, wherein the rib includes a guide surface to facilitate insertion of the detent into the slot and release of the detent from the slot.

12. The armrest console of claim 10, wherein the rotation arm and the detent are integrally formed and made from material capable of being elastically deformed to allow the detent to be moved into the slot when the cover is rotated to the fully open position and released from the slot when the cover is rotated down toward a closed position.

13. The armrest console of claim 10, wherein the detent includes a first surface extending from the main surface and a second surface substantially perpendicular to the first surface and a tip protruding from the second surface and extending from the second surface, and wherein the at least one slot includes at least one indentation, and wherein the tip is inserted into the at least one indentation of the at least one slot.

14. The armrest console of claim 10, wherein the rear wall includes three slots on a left rib, a center rib and a right rib, respectively.

15. The armrest console of claim 10, wherein the rib has a stop surface configured to contact the first surface of the detent to prevent the rotation arm to open further and stop further movement of the cover at its fully open position and a guide surface in a rotation path of the rotation arm that forms an angle with the stop surface, wherein the slot is formed by the stop surface and the guide surface.

16. The armrest console of claim 15, where the detent is integrally formed with the rotation arm, wherein the detent is disposed along a width direction of the rotation arm.

17. The armrest console of claim 16, wherein the rotation arm includes a first reinforcement rib along the width direction and adjacent to the detent and a plurality of second reinforcement ribs substantially perpendicular to the first reinforcement rib to strengthen the detent.

18. An armrest console, comprising:
a console body including a main compartment for storage and a back body, wherein the main compartment has a rear wall adjacent to the back body, and the rear wall, wherein the rear wall includes a plurality of ribs projecting from the rear wall toward the rotation arm, the rib includes a guide surface in a rotation path of the rotation arm, and a stop surface formed of an angle with the guide surface, and wherein at least one slot is formed in the rib;
a rotation arm having an arm body including a fixed portion and an end, wherein the rotation arm is pivotably connected to the back body, and the end includes a detent made of elastic material;
a cover attached to the rotation arm and rotatably connected to the back body to open and close an upper surface of the main compartment;
wherein the detent is configured to contact the stop surface and the guide surface of the rear wall and be deformed to lock the rotation arm by friction when the cover is moved to the fully open position and released from the slot when the cover is moved away from the fully open position.

19. The armrest console of claim 18, wherein the detent includes an over-molded rubber insert.

* * * * *